(12) United States Patent
Steele et al.

(10) Patent No.: US 6,535,297 B1
(45) Date of Patent: Mar. 18, 2003

(54) PROGRAMMABLE AUDITRON FOR MULTIFUNCTIONAL PRINTING SYSTEM

(75) Inventors: Darlene H. Steele, Penfield, NY (US); Jeffrey D. Debes, Rochester, NY (US); Donald J. Gusmano, Henrietta, NY (US); Gerald A. Wedekind, Rancho Palos Verdes, CA (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/248,472

(22) Filed: Feb. 11, 1999

Related U.S. Application Data
(60) Provisional application No. 60/076,432, filed on Mar. 2, 1998.

(51) Int. Cl.[7] .............................. G06F 15/00; G06K 1/00
(52) U.S. Cl. ...................... 358/1.15; 358/1.12; 358/1.5; 358/400; 358/296; 358/1.1; 358/1.13
(58) Field of Search .............................. 358/1.12, 1.15, 358/1.5, 400, 296, 1.1, 1.13; 379/100.4

(56) References Cited

U.S. PATENT DOCUMENTS

| | | | | |
|---|---|---|---|---|
| 5,117,258 A | * | 5/1992 | Iwata | 358/1.12 |
| 5,146,344 A | * | 9/1992 | Bennett et al. | 358/296 |
| 5,226,112 A | | 7/1993 | Mensing et al. | 395/114 |
| 5,255,106 A | * | 10/1993 | Castro | 358/400 |
| 5,436,730 A | | 7/1995 | Hube | 358/401 |
| 5,493,634 A | | 2/1996 | Bonk et al. | 395/101 |
| 5,579,447 A | | 11/1996 | Salgado | 395/109 |
| 5,659,845 A | | 8/1997 | Krist et al. | 399/79 |
| 6,026,380 A | * | 2/2000 | Weiler et al. | 358/1.12 |
| 6,064,838 A | * | 5/2000 | Maruta et al. | 399/79 |
| 6,118,766 A | * | 9/2000 | Akers | 370/249 |
| 6,292,267 B1 | * | 9/2001 | Mori et al. | 358/1.15 |

* cited by examiner

Primary Examiner—Edward Coles
Assistant Examiner—Ashanti Ghee
(74) Attorney, Agent, or Firm—Gary B. Cohen; Richard F. Spooner

(57) ABSTRACT

An auditron system is provided for a multifunctional printing system including a printing machine with a plurality of document processing services, the auditron system includes a user interface and a programmable auditron subsystem communicating with the user interface and printing machine. The auditron subsystem is responsive to input at the user interface and the input causes the auditron subsystem to be disposed in one of a plurality of modes relative to one of the plurality of document processing services. When the programmable auditron subsystem is disposed in a first one of a plurality of modes, an accounting of each document processing operation performed relative to the one of the plurality of document processing services is maintained on a mandatory basis, and when the programmable auditron subsystem is disposed in a second one of the plurality of modes, accounting of each document processing operation performed relative to the one of the plurality of document processing services is maintained selectively in accordance with user demand.

13 Claims, 8 Drawing Sheets

PROGRAMMABLE AUDITRON FOR MULTIFUNCTIONAL PRINTING SYSTEM

This Application is based on a Provisional Application No. 60/076,432 filed Mar. 2, 1998.

BACKGROUND

This invention relates generally to a multifunctional printing system and more particularly to an auditron for the multifunctional printing system in which the auditron is programmable to operate in one of a plurality of modes.

Electronic reprographic machines or electronic printing systems may possess a wide range of system functions, including binding, scanning, stapling, stitching, shrink wrapping, etc. A print shop may use an electronic reprographic machine with robust functionality to meet the needs of customers who seek copies of "short run" jobs. Even though short run jobs may not require the setting of a master, they still may utilize a large range of functions and materials (e.g. paper and toner). Maintaining records of those functions employed and materials used is a simple matter for electronic reprographic machines with digital capability and mass memory, e.g. a disk storage device.

In one example, a record of the materials used for each short run job (hereinafter referred to simply as "job") is maintained in a dedicated account for a customer. In one conventional approach, such as that disclosed in U.S. Pat. No. 5,117,258 to Iwata (Issued: May 26, 1992), each customer is mapped to a given paper type set with a plurality of paper types. Additionally, each paper type in the set is provided with a fixed rate. As the job for a given customer is executed, the number of sheets used for each paper type is counted and the number of sheets used for each paper type is tabulated. The tabulated sums are then multiplied with their respective rates so that a billable amount for the paper types used can be determined. The billable amounts are then summed to provide a total cost for paper used.

The approach of Iwata appears to be inefficient, with respect to memory usage because, as shown in FIG. 10 of Iwata, the set of paper types is set uniformly for each customer. It will be appreciated that the needs of the customers changes over time and the demand of even a single customer may vary over time. This apparent problem of setting uniform account size for each customer appears to be solved by U.S. Pat. No. 5,146,344 to Bennett (Issued: Sep. 8, 1992) in which a machine administrator can create a new account and specify a subset of system functions, from a set of system functions, to be used in the new account. In particular, it is believed that the set of system functions is "hard-coded" into the associated electronic reprographic machine in the form of a predesignated set of billing meters and the system administrator can specify which of the billing meters in the hard-coded set are to be used in setting up the new account.

A network based accounting system which is believed to be more flexible than the approach of the Bennett et al. Patent is disclosed in U.S. Pat. No. 5,659,845 to Krist et al. (Issued: Aug. 19, 1997). In the Krist Patent an account log manager, communicating with a network receives multiple sets of accounting related information from multiple document processing facilities. The first and second information sets are associated with one another through use of a common identifier. By reference to the common identifier, the account log manager stores the first and second sets of information in an account log file in such a way that the first and second information sets appear as a virtually integrated unit to a user. In practice, the virtually integrated unit can be downloaded from the account log file for calculating a bill based on the first and second information sets.

Both of the Bennett and Krist Patents contemplate an arrangement in which accounting is required for each job processed by a user. Considering that both the Bennett and Krist arrangements are used with "high-end" printing systems in which relatively large and expensive jobs are processed, imposing an accounting requirement seems reasonable. Imposing the same requirement for a "low or mid volume" multifunctional printing ("mfp") system may, however, not be as reasonable under all circumstances. For instance, requiring a user to account for the processing of a small copy job with an inexpensive feature set may not be cost beneficial. There are, nonetheless, circumstances where the owner of a low or midvolume mfp should probably require accounting. One such instance may occur in a law firm where accounting is necessary for the sake of billing clients. It would thus be desirable to provide an auditron system which is particularly suited for a mfp system in which accounting can be selectively employed.

SUMMARY OF THE INVENTION

In accordance with the presently disclosed invention there is provided an auditron system for a multifunctional printing system including a printing machine for producing prints from an electronic document stored therewith. The printing machine includes a plurality of document processing services with each of the plurality of document processing services causing one or more document processing operations to be performed relative to the electronic document. The auditron system, which controls a manner in which an accounting of information is performed with respect to one of the plurality of document processing services, comprises: a user interface; a programmable auditron subsystem communicating with said user interface and printing machine, said auditron subsystem being responsive to input at said user interface with the input causing the auditron subsystem to be disposed in one of a plurality of modes relative to the one of the plurality of document processing services; and wherein when said programmable auditron subsystem is disposed in a first one of the plurality of modes, an accounting of each document processing operation performed relative to the one of the plurality of document processing services is maintained on a mandatory basis, and when said programmable auditron subsystem is disposed in a second one of the plurality of modes, accounting of each document processing operation performed relative to the one of the plurality of document processing services is maintained selectively in accordance with user demand.

DESCRIPTION OF THE INVENTION

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
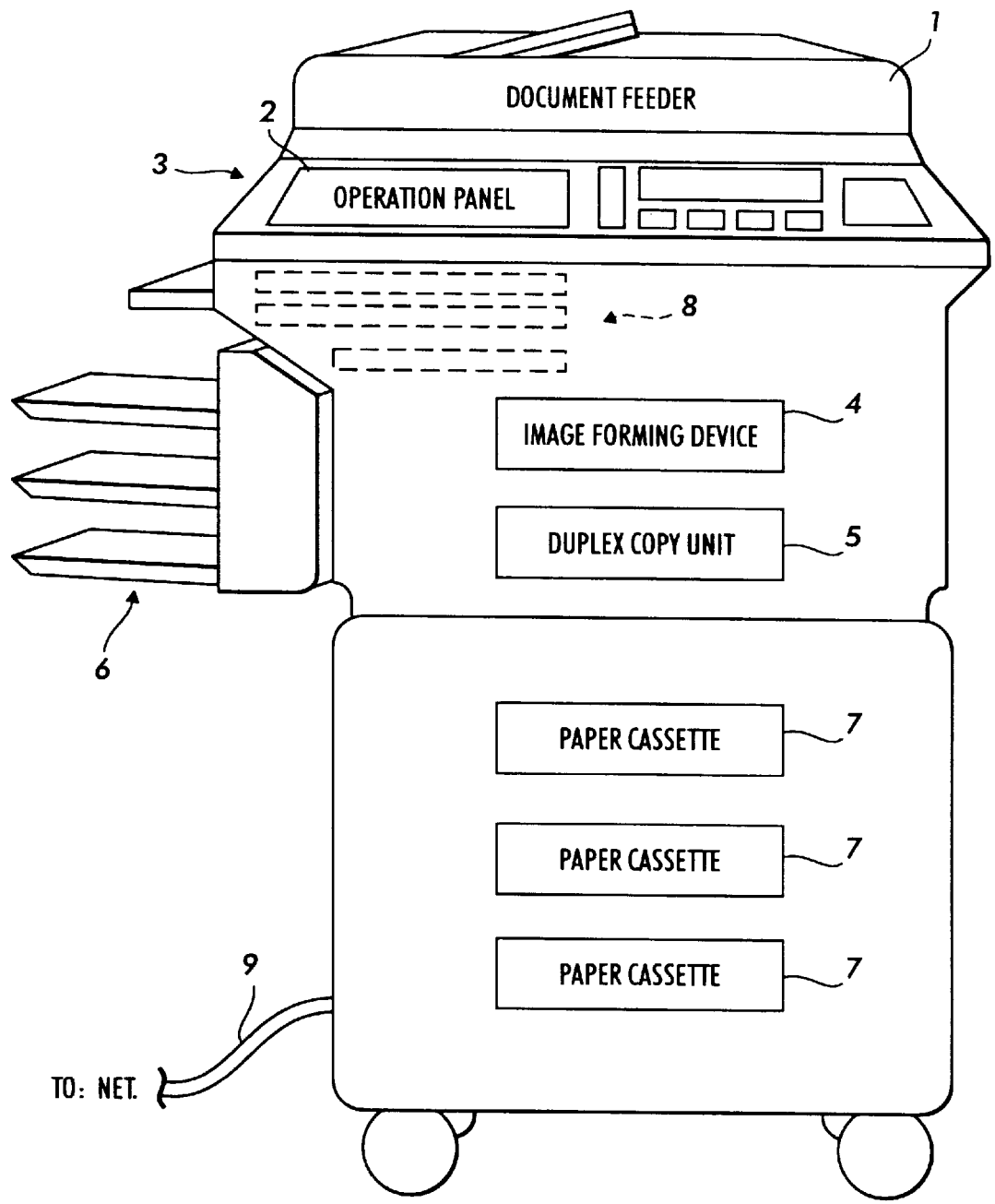
FIG. 1 a perspective view of a networked printing machine.

Referring to FIG. 1 of the drawings, a digital printing apparatus of the type suitable for use with the preferred embodiment is designated with the numeral 11. As shown, the system includes a document feeder and an operation (and display) panel or user interface 2. After desired conditions have been entered on the operation panel 2, through the aid of a suitable display, the document feeder conveys a document to a predetermined reading position on an image reading device 3 and, after the document has been read, drives it away from the reading position. The image reading device 3 illuminates the document brought to the reading position thereof. The resulting reflection from the document is transformed to a corresponding electric signal, or image signal, by a solid state imaging device, e.g., a CCD (Charge Coupled Device) image sensor. An image forming device 4 forms an image represented by the image signal on a plain paper or a thermosensitive paper by an electrophotographic, thermosensitive, heat transfer, ink jet or similar conventional system.

As a paper is fed from any one of paper cassettes 7 to the image on forming device 4, the device 4 forms an image on one side of the paper. A duplex copy unit 5 is constructed to turn over the paper carrying the image on one side thereof and again feed it to the image forming device 4. As a result, an image is formed on the other side of the paper to complete a duplex copy. The duplex copy unit 5 has customarily been designed to refeed the paper immediately or to sequentially refeed a plurality of papers stacked one upon the other, from the bottom paper to the top paper. The papers, or duplex copies, driven out of the image forming device 4 are sequentially sorted by a output device 6 in order of page or page by page.

Applications, generally 8, share the document feeder 1, operation panel 2, image reading device 3, image forming device 4, duplex unit 5, output device 6, and paper cassettes 7 which are the resources built in the copier system. As will appear, the applications include a copier application, a printer (IOT) application, a facsimile (Fax) application and other applications. Additionally, the digital copier system is coupled with a network by way of a conventional network connection 9.

Figure 2:
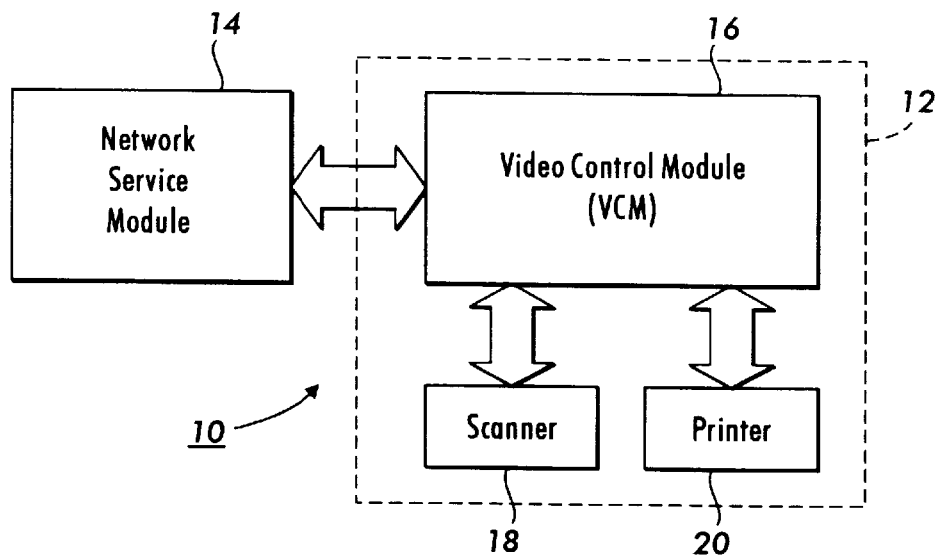
FIG. 2 is a block diagram depicting a multifunctional, network adaptive printing machine.

Referring to FIG. 2, a multifunctional, network adaptive printing system is designated by the numeral 10. The printing system 10 includes a printing machine 12 operatively coupled with a network service module 14. The printing machine 12 includes an electronic subsystem 16, referred to as a video control module (VCM), communicating with a scanner 18 and a printer 20. In one example, the VCM 16, which is described in detail in U.S. Pat. No. 5,579,447 to Salgado, the disclosure of which is incorporated herein by reference, coordinates the operation of the scanner and printer in a digital copying arrangement. In a digital copying arrangement, the scanner 18 (also referred to as image input terminal (IIT)) reads an image on an original document by using a CCD full width array and converts analog video signals, as gathered, into digital signals. In turn, an image processing system (not shown), associated with the scanner 18, executes signal correction and the like, converts the corrected signals into multi-level signals (e.g. binary signals), compresses the multi-level signals and preferably stores the same in electronic precollation (not shown).

Referring still to FIG. 2, the printer 20 (also referred to as image output terminal (IOT)) preferably includes a xerographic print engine. In one example, the print engine has a multi-pitch belt (not shown) which is written on with an imaging source, such as a synchronous source (e.g. laser raster output scanning device) or an asynchronous source (e.g. LED print bar). In a printing context, the multi-level image data is read out of the EPC memory, while the imaging source is turned on and off, in accordance with the image data, forming a latent image on the photoreceptor. In turn, the latent image is developed with, for example, a hybrid jumping development technique and transferred to a print media sheet. Upon fusing the resulting print, it may be inverted for duplexing or simply outputted. It will be appreciated by those skilled in the art that the printer can assume other forms besides a xerographic print engine without altering the concept upon which the disclosed embodiment is based. For example, the printing system 10 could be implemented with a thermal ink jet or ionographic printer.

Figure 3:
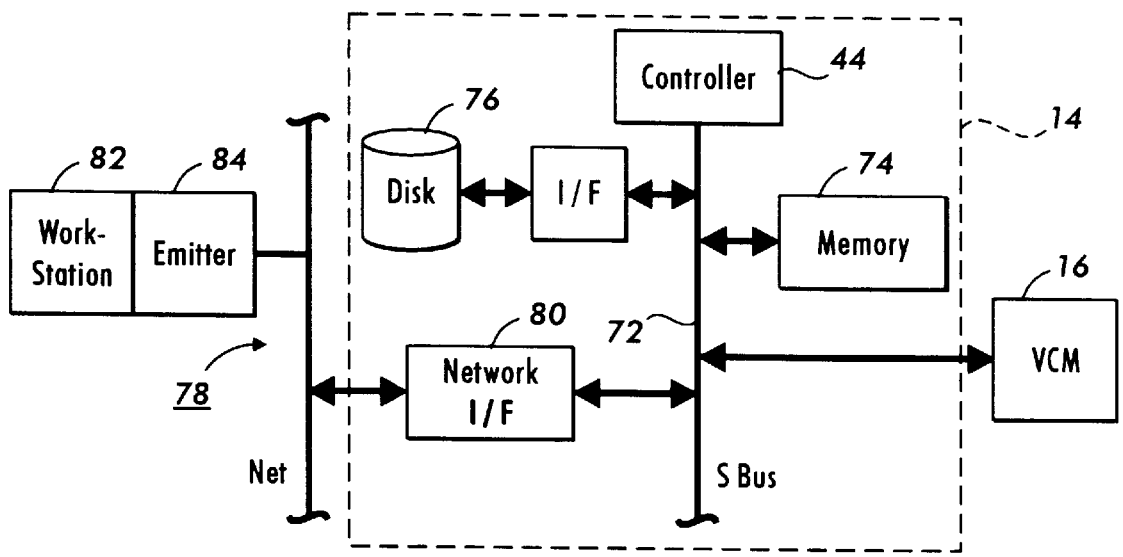
FIG. 3 is a block diagram of a network controller for the printing machine of FIG. 3.

Referring to FIG. 3, the network service module 14 is discussed in further detail. As will be recognized by those skilled in the art, the architecture of the network service module is similar to that of a known "PC clone". More particularly, in one example, a controller 44 assumes the form of a SPARC processor, manufactured by Sun Microsystems, Inc., is coupled with a standard SBus 72. In the illustrated embodiment of FIG. 3, a host memory 74, which preferably assumes the form of DRAM, and a SCSI disk drive device 76 are coupled operatively to the SBus 72. While not shown in FIG. 3, a storage or I/O device could be coupled with the SBus with a suitable interface chip. As further shown in FIG. 3, the SBus is coupled with a network by way of an appropriate network interface 80. In one example, the network interface includes all of the hardware and software necessary to relate the hardware/software components of the controller 44 with the hardware/software components of the network 24. The network interface 80 could be provided with, among other software, Netware® from Novell Corp. As shown, the Network Server module 14 may be interposed between the Video Control Module (VCM) labelled 16 in both FIGS. 2 and 3 and the network 24 itself.

In one example, the network 24 includes a client, such as a workstation 82 with an emitter or driver 84. In operation, a user may generate a job including a plurality of electronic pages and a set of processing instructions. In turn, the job is converted, with the emitter, into a representation written in a page description language, such as PostScript. The job is then transmitted to the controller 44 where it is interpreted with a decomposer, such as one provided by Adobe Corporation. Some of the principles underlying the concept of interpreting a PDL job are provided in U.S. Pat. No. 5,493,634 to Bonk et al. and U.S. Pat. No. 5,226,112 to Mensing et al., the disclosures of both references being incorporated herein by reference. Further details regarding a technique for generating a job in a PDL may be obtained by reference to the following text, the pertinent portions of which are incorporated herein by reference:

PostScript® Language Reference Manual Second Edition Addison-Wesley Publishing Co. 1990

Further details regarding the implementation of a network capable printing system may be obtained by reference to U.S. Pat. No. 5,436,730 to Hube (Issued: Jul. 25, 1995), the disclosure of which is incorporated herein by reference.

Figure 4:
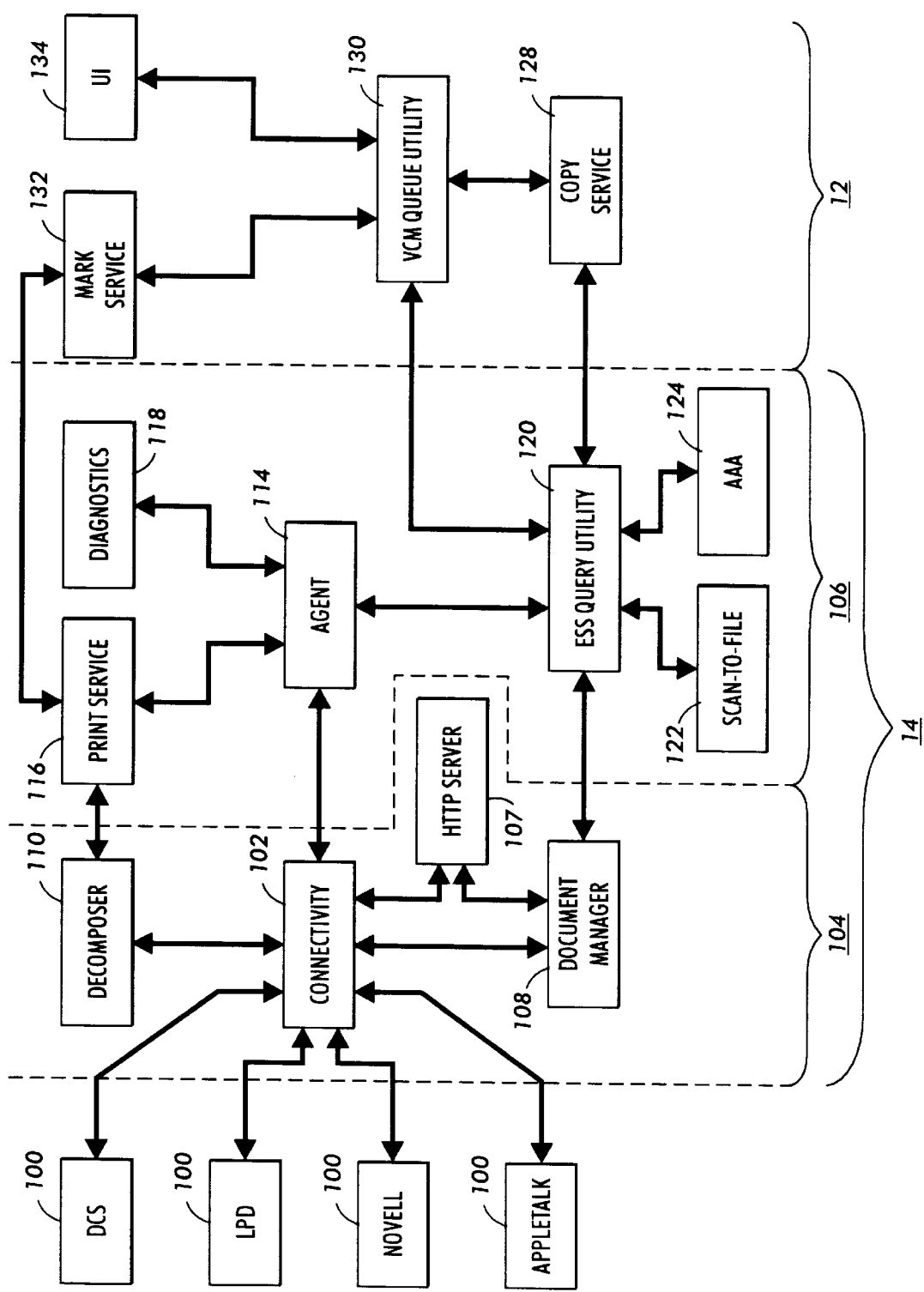
FIG. 4 is a block diagram showing the network controller of FIG. 4 in greater detail.

Referring to FIG. 4, a block diagram which further elaborates on the network controller schematic of FIG. 3 is shown. In the illustrated embodiment of FIG. 4 the clients 100 are configured with a variety of protocols, such as LPD (a protocol for UNIX), Novell network protocol, AppleTalk and DCS (a protocol for Xerox digital copiers known as the "Document Centre Systems"). As contemplated, at least one of the clients 100 includes a conventional browsing system. The clients communicate with the network server or electronic subsystem ("ESS") 14 by way of Connectivity Services (CS) 102. As shown in FIG. 4, the ESS comprises two parts, namely a Microkernel 104 (more particularly, a partial abstract model of a Microkernal mapped into a model based on DPA ISO 10175/POSIX IEEE 1003.7) and an application specific subsystem 106.

As will appear below, operation of the preferred embodiment is greatly facilitated by providing the ESS 14 with a conventional HTTP server 107. Essentially, the HTTP server operates in cooperation with the at least one browing subsystem mentioned above to provide one or more corresponding clients with the capability of communicating with the ESS 14, notwithstanding significant software differences between the at least one client and the ESS. As should be appreciated, the HTTP server 107 could be disposed remotely of the ESS 14 on the network without impairing the concept upon which the preferred embodiment is based. In one example, the HTTP server would be disposed on the network at a location which is both remote from the ESS 14 and accessible by a both multiple clients and multiple printing machines.

In general, a network or point-to-point print submission originates at the Protocol Services level of the (CS) subsystem. Each Protocol Service listens on a well-known socket for a connection indication. When a Protocol Service receives the connection indication it submits a job request to the Connectivity Core. The Connectivity Core will translate this request into a DPA-compatible format and forward it to a DM subsystem 108. When the job submission is granted, the Protocol Services can submit one or more documents. Document submission is achieved by sending a document request and an I/O descriptor to the Connectivity Core. This will also be translated and forwarded to the DM subsystem.

After the document has been accepted, the Protocol Service starts to receive data from the underlying protocol stack and writes it into the I/O descriptor. This data will read on the other side of the I/O descriptor by a consumer or will be spooled somewhere in the system. When the remote client indicates that there is no more data, the I/O descriptor is closed signaling the end of this specific document. After all documents have been received, a job termination request is sent from the Protocol Services to the Connectivity Core, which then forwards it to the DM. Eventually, this request will be completed by the system, and the Protocol Service will release all resources associated with the job.

The Microkernel has a Document Management (DM) subsystem that performs most of the DPA/POSIX Server functionality. The DM subsystem validates user requests, queues requests, spools document data, schedules the job for the device, and collects and maintains status information. The DM subsystem extends the DPA/POSIX Server in some aspects, since it can be configured to handle scan jobs (for filing or faxing) and copying jobs. DM provides for document sniffing, spooling, and scheduling services. Service providers, such as Document Processing 110 can register their services with DM.

Document Processing (DP), which includes the Image Frame Store (IFS) and the instantiation of at least one producer, is provided with the Microkernel. DP processes documents into images (full frame buffers or raster-scan bands, depending on the configuration of the Microkernel). The Image Frame Store assigns producers to consumers.

Essentially, the Microkernal 104 can be thought of as a generic ESS while the subsystem 106 can be thought of as an application specific ESS. That is, the Microkernal 104 contains the fundamental building blocks of a print server, while the subsystem 106 contains all of the software components necessary to, in conjunction with the Microkernal 104, provide the VCM 16 with a desired level of operability. More particularly, an Agent, which filters out all commands/ requests emanating from the Microkernal 104, is designated with the numeral 114. Basically, the Agent serves as a "hook" into the generic ESS to facilitate the handling of all remote requests. The Agent works in conjunction with other services, such as Print Services 116 and Diagnostics 118, to support the operation of the VCM.

As contemplated in one example, the Agent 114 also communicates with an ESS Queue Utility 120 to maintain a composite queue. While the functions of the Agent and the ESS Queue Utility could be combined, they are shown as separate here in a modularized approach. The ESS Queue Utility also communicates with a Scan-to-File process 122, which process facilitates the filing of previously scanned documents to the network, as well as an Accounting/ Authorization/Authentication service ("AAA") 124. The AAA is used, among other things to authorize the performance of certain acts sought to be performed by a remote client. In one example, the AAA is implemented with software of the type found in Xerox' DocuSP 1.0 print server. As will appear, the AAA facilitates the preferred embodiment in that it prevents the undesirable tampering of one or more queued jobs by unauthorized system users. Additionally, the AAA is configurable to provide both a programmable auditron and service access setting arrangement discussed in further detail below.

Referring to the printing machine or copier 12 aspect of FIG. 4, a Copy Service 128 communicates with the ESS Queue Utility 120 and a VCM Queue Utility 130. The Copy Service, which resides, in one example, on the controller 44 (FIG. 3) performs a function, on the copy side, comparable to the DM 108. Among other things, the Copy Service, supervises the development of copy and Fax jobs as well as the management of the VCM Queue. The VCM Queue Utility communicates with and gathers queue related data from a Mark Service 132 and a suitable User Interface 134. While the functions of the User Interface and the VCM Queue Utility could be combined, they are shown as separate here in a modularized approach.

The Mark Service is associated with the printer 20 (FIG. 2) and a VCM Queue is associated with the User Interface, as on, for example, the Xerox Document Centre 35 digital copier. As will be appreciated by those skilled in the art, both of the Mark Service and the User Interface are key components in developing and maintaining the VCM Queue. For example, the complexion of the VCM Queue is constantly being altered as a result of activity in the Mark Service, while a significant amount of control is asserted on the VCM Queue as a function of communication with the User Interface.

Referring still to FIG. 4, the AAA 124 includes configurable software which is used to provide the programmable auditron system. As contemplated by the preferred embodiment, the auditron communicates with the copier 12 and the network clients so that the auditron is capable of serving both local and remote needs. In one example of remote use, information is provided to the AAA, via the header portion of a job, by way of the following functional specification:

Owner (aka Sender) Identification at Send Time

Owner's encrypted PIN and Owner's User Name are sent with a job to the ESS 14; both are preferably non-null or null. Owner's PIN uniquely determines Owner's identity; Owner's Name provides redundancy to enable typographical detection and reduce the likelihood of PIN guessing.

For one known print driver:

If the Owner has previously asked the driver to cache his/her authentication information, the driver will supply the most recently cached PIN and User Name automatically.

Owner may also supply or overwrite these via type-in.

If not supplied via caching or type in, a null PIN and Name will be sent.

Send tool displays any typed-in PIN as asterisks; it stores any cached PIN, encrypted, in an undisclosed location.

Other known drivers may be incapable of sending Owner PIN or Owner's Name; in such cases, the system will behave as if null values had been sent.

Account Identification at Send Time

An Account Number may be sent with the job. It specifies the Account whose Auditron limit will apply and under which accounting information this job will be accumulated.

For one known print driver:

At send time, the Owner may type in an Account to be charged for this job.

If the Owner does not specify an Account, a null Account number is sent.

Other drivers may lack the capability of sending an Account Number; in such cases the system will behave as if a null value had been sent.

Printer Behavior Upon Receipt

Job will be rejected prior to spooling in Memory 74 (FIG. 3) if:

Owner PIN is null and Owner Name is non-null, or vice versa;

Owner PIN and Owner Name are both non-null but do not match;

Account Number is non-null and invalid.

If Auditron is ENABLED the following Authorization & Auditron is done locally:

Job is rejected if Owner PIN and Owner Name are not provided.

Job is rejected if an Account Number is supplied, but is not properly registered.

Job is rejected if mismatch between Owner PIN and Owner Name or Owner PIN and Owner Name do not identify a properly registered User.

Job is rejected if Owner's access rights do not include "Print".

Accounting is tracked and Auditron limit enforced per specified Account (if Account Number was null, Owner's default Account is used).

Figure 5:
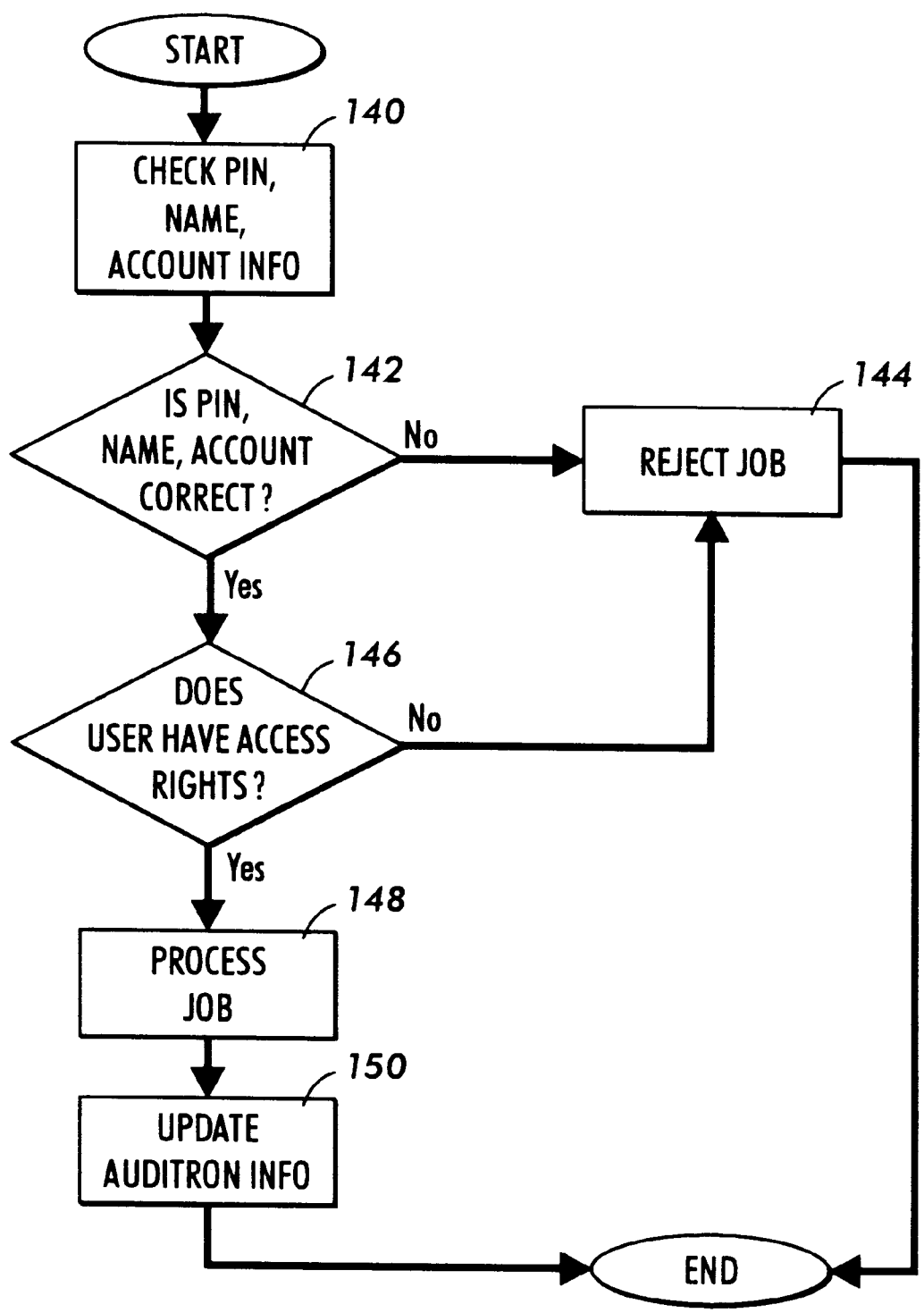
FIG. 5 is a flow diagram illustrating the manner in an authorization service determines the extent to which a user can access one or more services of the multifunctional network adaptive printing machine.

Referring now to FIG. 5, further insight regarding the sending of information to the AAA 124 is provided. In particular, at step 140 the AAA examines the PIN, Name and Account Information of a job to determine an extent to which a user is authorized to use the printing system 10. If, the answer to the check at step 142 is negative, then the job is rejected by way of step 144. Assuming that a positive answer to the check of step 142 is obtained, then another check is performed, at step 146, to determine the access rights for the job. As will appear, access rights will vary as a function of a program set at one of the utilities 120, 130 (or an equivalent process within the printing system 10) (FIG. 4) using the UI 134. In one example, use of certain selected subsystems (e.g. facsimile subsystem) or a special operation (e.g. advancing a job in a print queue) requires a special access right. On the other hand, various routine operations (e.g. inserting a job at the bottom of a print queue and printing it in normal sequence) will require only a minimal access right. Assuming that the User has a requisite access right, then the job is, via step 148, processed; otherwise, the job is rejected with step 144. If necessary, auditron information is updated at step 150. As will be appreciated by those skilled in the art, the technique of FIG. 5 provides a mechanism permitting remote users to be authorized locally for purposes of using a local Auditron system.

The authorization functionality of the AAA can be understood by reference to the following functional specification:

Users

In order to gain certain additional rights or privileges the system will support user profiles. Every user who needs to use any of the protected modes of the system (such as Auditron, deleting a job from a queue, manipulating fax mailboxes, SA/KO functionality) will have a user profile in order to do so. The user will be assigned the following:

User Name (e.g. 20 characters): Identifies the user so that a Machine Owner(s) can easily maintain user profiles. Also used for remote log on.

PIN (e.g. 1 to 12 digits): Identifies the user when logging on the system (either locally or remotely) so that such user can exercise any rights or privileges that s/he may possess.

Special User Type: Gives a special user, such as an AU (an "Authorized User" having the ability to give their jobs a priority which is higher than that given ordinary jobs), SA (a "System Administrator" who sets up and maintains all settings related to the networked printing system), KO (a "Key Operator" who set up and maintains settings for the copier and fax subsystems) and Owner (one who sets up and maintains the authorization and auditron aspects of the AAA 124).

Default Account Number (e.g. 1 to 12 digits): Used when Auditron is enabled (Mode 3 (see Description below)) to track the user's system use within a specific account. '0' means that an account has not been assigned.

Access Rights (copy, print, fax send, network scanning): Used when Auditron is enabled for determining what service(s) (or selected operations) to which the user has access. A user can be assigned no access rights or any combination of the services (or operations) listed herein.

Fax Mailbox Number (e.g. 0–30): Gives the user access rights to a fax mailbox. '0' means that a fax mailbox has not been assigned.

In one example of operation, the system supports anywhere from 300–2000 users and the Machine Owner(s) is allowed to create, modify and/or delete user information (including PINs).

PINS

The PIN (Personal Identification Number) is a numeric code between 1 and N digits, and it is uniquely assigned to each user. Leading zeroes are comprehended in assignment, entry, display and searching. For example, if the PIN is 000000000307, the user does not have to type in the 9 leading zeroes. That is, the user need only type in '307.' When a PIN is assigned the system will verify that the PIN is not '0' (initialized value) and that the PIN is unique.

Local Log-On

Entering a PIN is all that is needed in order for a user to locally identify him/herself and log on the system. The user is prompted for a Log-On when the System determines that a requested operation requires a valid PIN, and no one is currently logged in.

The user will be prompted to enter a PIN. The numbers entered will not be shown during log on, instead the UI will display '*' for each number entered. The user should be able to clear the PIN in case a mistake is made. After a valid PIN has been entered and accepted by the system, the user is able to use the system for any authorized activities until a log off is requested or a time-out is reached. Authorized activities are determined by the user's profile, and the way the system is set (e.g., Auditron mode, Job Rights setting). If a user is not authorized to do a requested operation, the user should be informed that s/he does not have access.

Also at log-on time the user should be provided the ability to over-ride their default account number. This is provided in case a user needs to have multiple Auditron accounts. The numbers entered will not be shown, instead the UI will display '*" for each number entered. The user should be able to clear the account number in case a mistake is made. It the user enters an account number, the system verifies whether it is a valid account.

If an invalid PIN or account is entered, the user is informed and allowed to re-enter the information. The user should be provided a mechanism for canceling the log-on process at any time. After the third consecutive invalid entry, the user is precluded from attempting to log on with the invalid PIN or to access the account.

Remote Log-On

Once the remote request gets to the local system, the same authorization process that is done for local log-on is followed (i.e., a determination is made as to whether the remote user is authorized to do a given requested operation).

Local Log-Off

Once a valid PIN has been entered, the user can at any time request to be logged off. If the user does not explicitly log off, a time-out may be used to initiate an automatic log off.

Local Time-Out

The PIN entered will automatically time out at a predetermined delay once there is no UI activity. Also if an invalid PIN has been entered and there is no further UI activity, the system will use the same automatic time-out to return to the default UI screen. In all cases any UI activity before the actual time-out occurs will reset the time-out. This time-out is programmable by the machine Owners(s).

Job Rights

Job rights are defined as the ability to modify, delete, hold or release a job that is in the system queue (the queue, in one example, being in Memory 74 of FIG. 3). The system may function under at least two approaches:

1) All users have rights for all jobs; or
2) Users have job rights only for jobs they own: however, the Machine Owner(s) has job rights in all jobs.

In one example, if the system is unable to identify the owner of a job, then all users have job rights for that job. It is contemplated that system settings of "Job Rights" can be altered by the Machine Owner(s) for the sake of accommodating changes in system environment.

Figure 6:
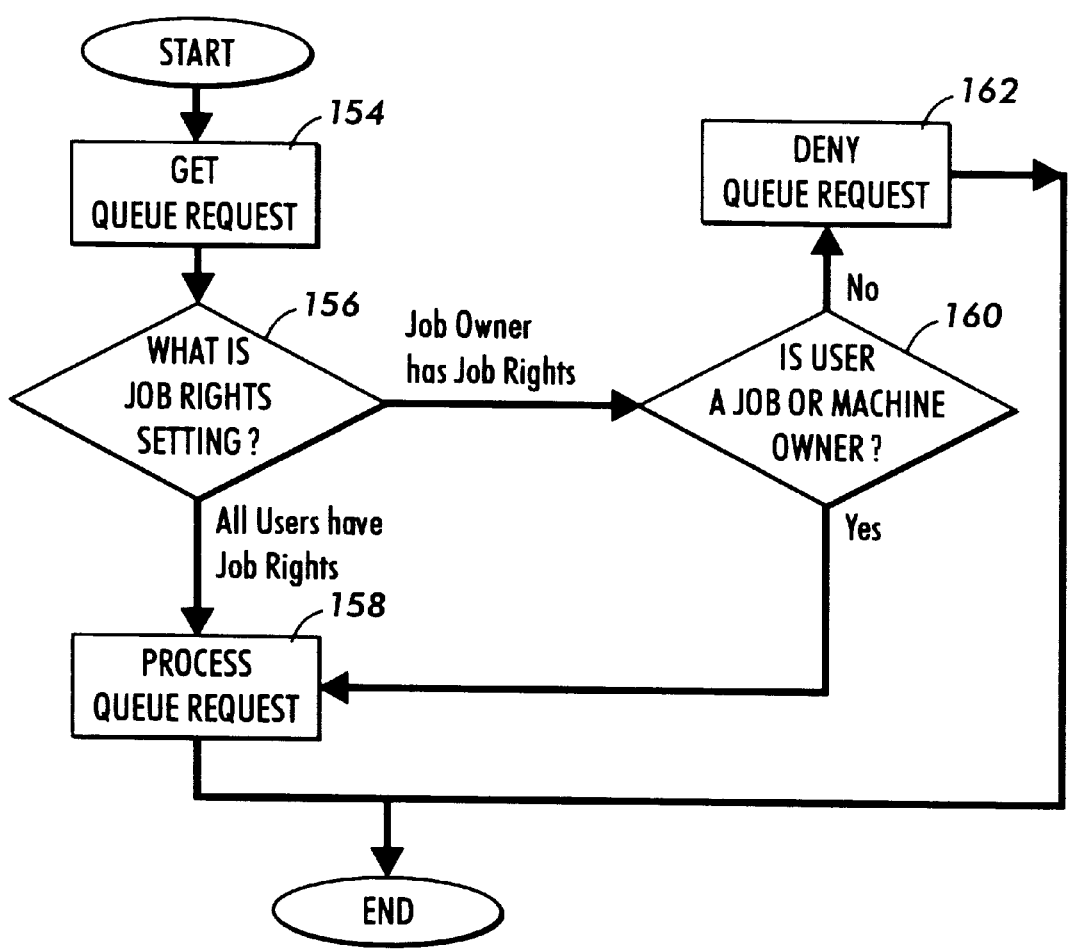
FIG. 6 is a flow diagram illustrating the manner in an authorization service determines the extent to which a user can perform a queue request with respect to the multifunctional network adaptive printing machine.

Referring to FIG. 6, a fuller understanding of "Job Rights" can be obtained. As should be recognized, a job may a "queue request" including, among other commands, a "modify", "delete", "hold", "release" or "promote" command. These commands, the significance of which follows from their titles, are used in, for example Xerox' Document Centre System 35 Printing System to manipulate jobs in, among other queues, the print queue. Referring specifically to step 154, the AAA 124 (FIG. 4) reads or gets a Queue Request and examines a Job Rights Setting of the AAA at step 156. If all users have Job Rights, then the process proceeds to step 158 so that the queue request can be executed. On the other hand, if only Job Owners have Job Rights, then the process proceeds to the query 160. For those instances in which the requester either owns the subject job or is a machine owner, then the queue request is executed. If the requester is not the owner of the job or the machine, however, the queue request is, at step 162, denied.

The auditron functionality of the AAA 124 can be understood by reference to the following functional specification:

Overview

The Auditron facilitates the accounting of system usage of copy, print, fax send, and network scanning jobs and controls access to the request of these jobs. Accounting information is tracked per service (copy, print, fax send, and network scanning) on an individual account basis. The Auditron can be set up for one, all, or any combination of the services. It can also be set up to work on a required or voluntary basis for each service (See Description of "Modes" below).

Auditron Structure

The Auditron includes information regarding Users and Accounts. In one contemplated approach, each User is assigned an Account and access rights. The Account is accessed by entering a unique PIN, and a user profile is used to determine the extent of user access rights.

Accounts

The system will be able to support up to 300 customer accounts (2000 accounts is optional). An account may consist of the following parameters:

account number (0 to 12 digits)
copy limit (0–65,000 in increments of 1,000)

copy counter (0–65,000)

print limit (0–65,000 in increments of 1,000)

print counter (0–65,000)

fax send limit (0–65,000 in increments of 1,000)

fax send counter (0–65,000)

network scan limit (0–65,000 in increments of 1,000)

network scan counter (0–65,000)

The copy counter is used to keep track of all the copies the IOT makes from walk-up copy jobs. It is incremented at the same time as a 'Billing' counter (i.e., on IOT delivery of imaged sheets). For duplex sheets the counter is incremented twice. Each account is preferably accurate within 5 counts or 0.01% of the included value (whichever is less) each month. The print counter keeps track of all copies that the IOT makes from print jobs. A fax send counter is used to track the number of sheets for fax send jobs, and the network scan counter keeps track of the number of sheets for network scan jobs.

A service limit is the maximum number that a corresponding counter can reach. The service limit is, in one example, set by increments of 1,000.

The system can support the ability of a user to have access to multiple accounts by allowing the user to over-ride their default account number.

Account #0 is used for counting images made in a Diagnostic mode. (Note: As contemplated, the Auditron cannot be set to Mode 3 (see below) if any user's default account number is '0.')

In one exemplary approach, each service (copy, print, fax send, or network scanning) is settable in one of the following Auditron modes:

Mode 0: Auditron Off—Auditron is disabled allowing all users to have access to the service. There is no PIN/Account Number entry or Authorization in order to gain access. The counter for this service is not incremented even if a user or account is logged in.

Mode 3: Access Control—Auditron is enabled. On the local UI the user is prompted to enter a PIN in order to have access to that service. (They are also allowed to enter in an account number if desired.) Remotely the user sends their user name and PIN with their job (also the account number if desired). In either case a valid PIN is provided and the user and account is properly authorized before access to the service is given. A properly authorized user means that the access rights assigned to the PIN allow for the requested service. A properly authorized account means that the service counter for this account has not exceeded its corresponding limit.

Any jobs submitted to the service are tracked under the logged in account by incrementing the appropriate counter for that service. The logged in account is the account number that the user provided during the log in process, otherwise, it is the default account number associated with the provided PIN.

Each time the service counter is incremented, it is compared to see if its corresponding limit has been reached. If an account's service limit is reached while a job is in progress, the system can work in one of two ways:

finish the job to completion; or automatically cancel the job

The default is to finish the job to completion; however, as contemplated, a Machine Owner(s) can change this setting.

In either case, i.e. whether the job finishes or is automatically canceled, the user will be informed that the account is full and will not be allowed to use the service that has exceeded its limit. Subsequent requests to access that account and service will also display this information.

Mode 4: Accounting—Auditron is done on a voluntary basis. Users press the 'Access' key and enter an account number if they wish to have accounting done for their activity. However, they are not required to do so in order to have access to the service. (PINs are not entered, and authorization is not needed.) If a valid account number is provided, any jobs submitted to the service are tracked under the appropriate counter for that account. The service limit is ignored.

The process for entering an account number is the same as entering an account number when logging in with a PIN. The log off process is also the same.

For all Auditron Modes, "machine status", "queue display", and "paper tray set-up" is always available. The default for each service is 'Mode 0.' In one approach, the machine Owner(s) change the Auditron mode.

Figure 7:
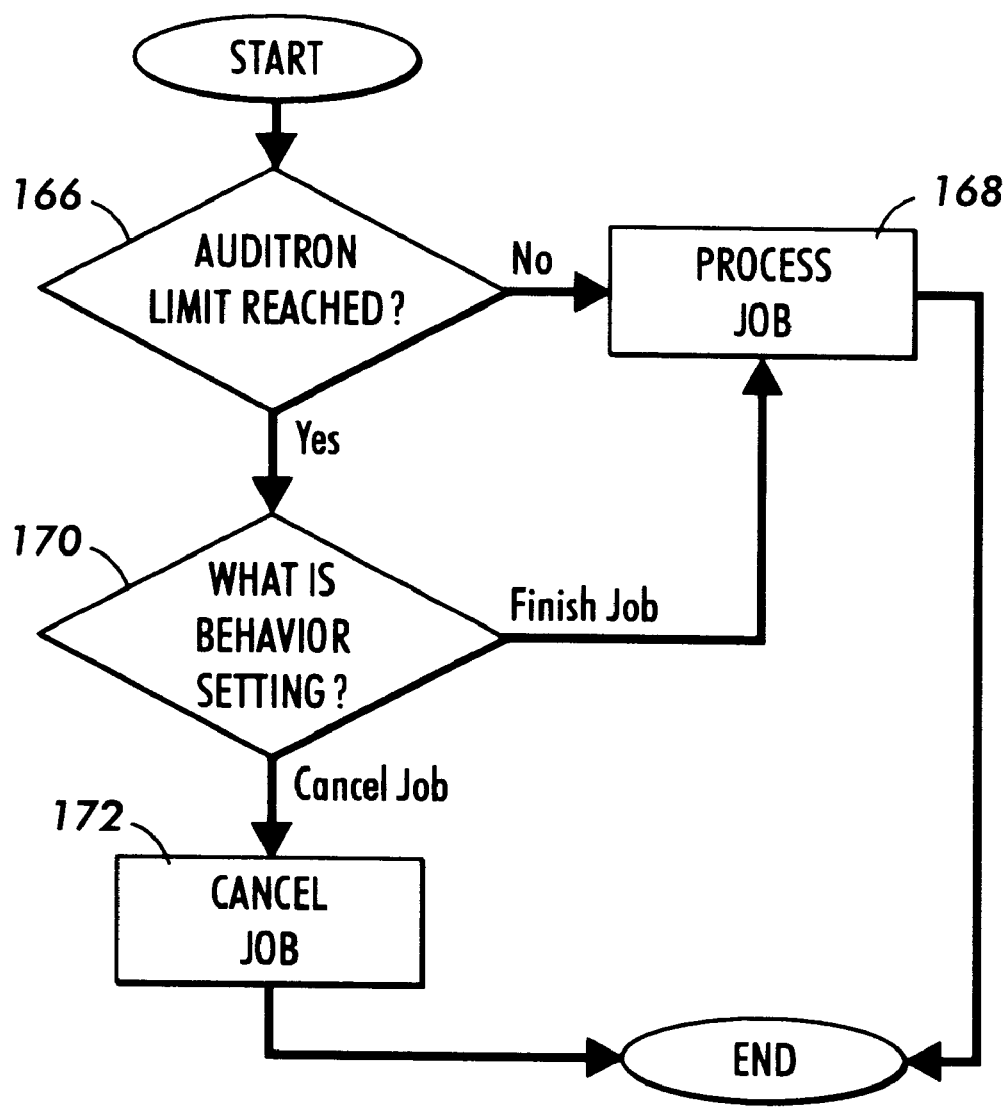
FIG. 7 is a flow diagram illustrating a scheme for managing a situation in which an auditron limit is reached.

For further understanding of how Mode 3 operates, reference can be made to FIGS. 5 and 7. As indicated above in the description of Mode 3, a limit can be reached for a given service counter. Referring specifically to step 166 of FIG. 7, a check is performed at the AAA 124 to determine when a limit for any one counter is reached. In one example, a user may reach a limit by producing more prints than the limit for which his/her account was set. If a limit has not been reached, then the job will be processed via step 168. In the event that the limit is reached, however, a check is performed at step 170 to determine whether processing of the job should be continued. Under a contemplated default setting, the job will finish; however, a Machine Owner can set the system to cancel the job via step 172. In any event, a message is communicated to affected job owners when a given counter limit is encountered.

Figure 8:
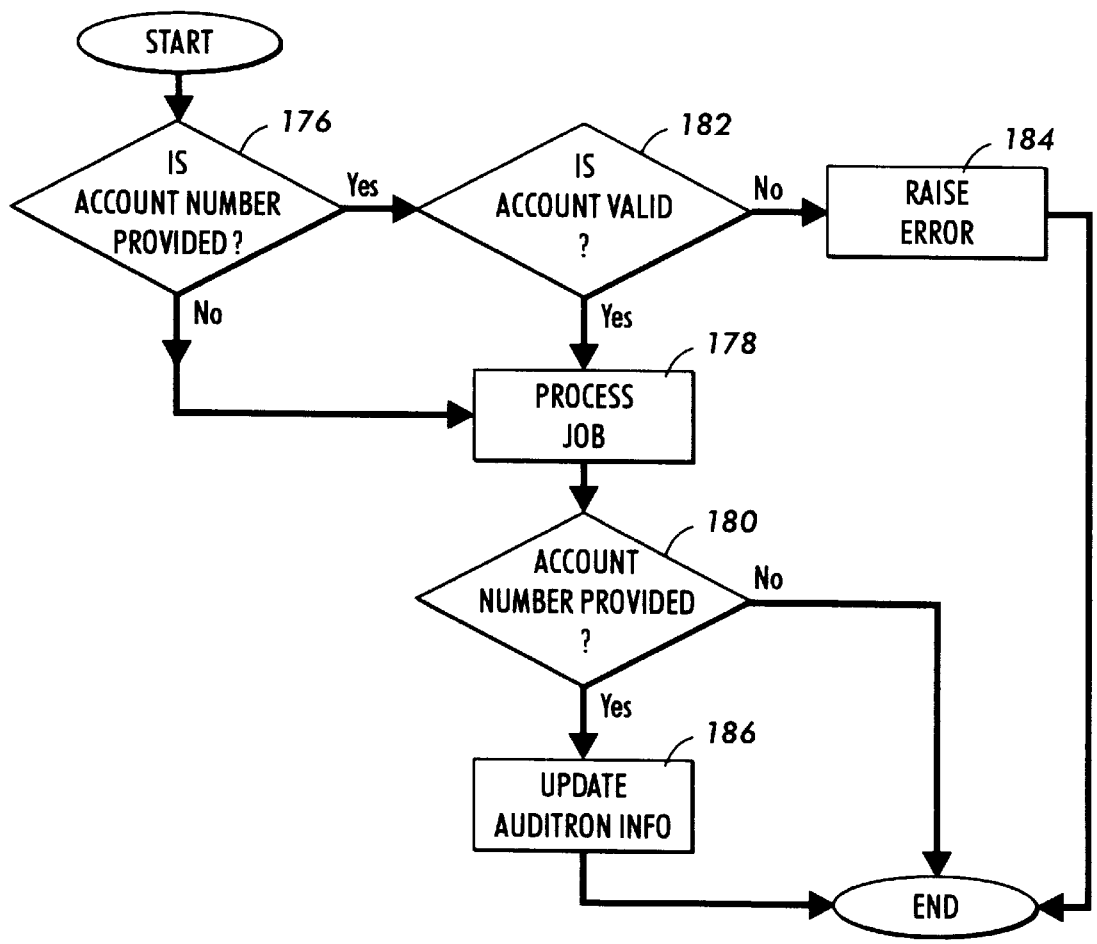
FIG. 8 is a flow diagram illustrating the operation of a multi-mode auditron.

Referring to FIG. 8, further description of Mode 4 is provided. More particularly, at step 176 the AAA determines whether the user desires to obtain a job accounting for a provided job. In Mode 4, a user indicates that accounting is not desired by simply omitting an account number from the job. In the event that no account number is provided, then the job is processed (step 178) and the process proceeds to an END since the answer to the query 180 will be negative. On the other hand, if an account number is provided, a validity check is performed with step 182 and, if the account number is invalid, an ERROR is raised at step 184. If the account number is valid, the job is processed at step 178 and, if necessary, auditron information previously provided by the current job user is updated at step 186.

Figure 9:
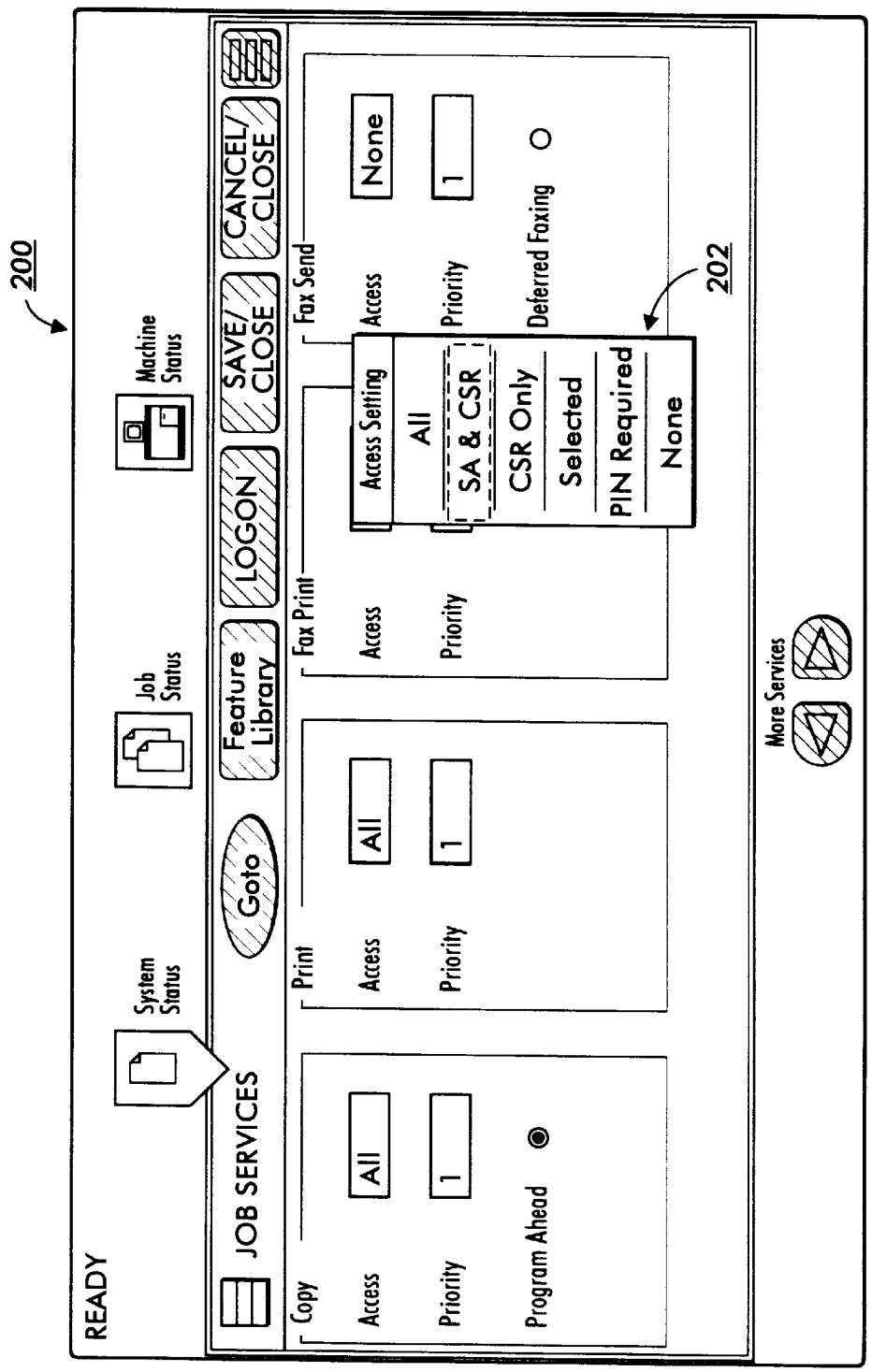
FIG. 9 is a dialog usable in programming access settings relative to a plurality of services associated with the multifunctional, network adaptive printing machine.

Referring now to FIG. 9, another embodiment of the AAA 124 (FIG. 4) is described. As shown by a dialog 200 of FIG. 9, various levels of access rights can be programmed for each service of the printing system 10. As contemplated, a special user, such as a KO or SA uses the dialog to indicate a set of users which is entitled to use a selected service. Through use of a suitable pull-down menu 202, the KO/SA can designate whether a service is intended to be made available to one of: "All [Users]", "SA (and/or KO) & CSR", "CSR Only", "Selected [Users], or "None [i.e. No Users]". Additionally, the KO/SA can designate that a service can only be accessed through provision of identification information (e.g. a PIN). It should be recognized that the PIN can be set in conjunction with another setting, such as "Selected" or "All". In such case, the KO/SA might provide an Access Setting in which one or more users are required to provide a PIN. The significance of the dialog 200 will become more apparent from the following discussion of exemplary applications.

For one application, the KO/SA may wish to limit the accessibility of various services to an exclusive user group. In a first example, a service may become inoperable (i.e. go "offline") and the KO/SA may wish to make it available to "CSR Only" In this event, the CSR would be required to provide identification information before accessing the offline service. As should be appreciated, the "CSR Only" setting permits the CSR to prevent the submission of non-CSR jobs during the service of the printing system by the CSR. In another example, the KO/SA may simply wish to make more a expensive service, such as a fax-related service accessible to selected or special users only. At the same time, the KO/SA may require a PIN to identify the special users for the sake of providing an added level of security.

For another application, various priorities or preferences among services can be achieved for the services as a function of the manner in which Access Settings are configured. In one example, employment of the fax service may be viewed as more exclusive than employment of other services (e.g. copy, print or scan-to-file service). As shown in FIG. 9, the FaxPrint service is limited to just the SA and CSR, while the Copy and Print services are available to all users. It will be appreciated that various combinations of preference can be envisioned. For instance, users of the copier can be given preference over network users and vice versa.

For another application, the Access Settings can be reset in view of system demands. In one example, it may be found that a particular user is delinquent with respect to his/her printing bills. In this event, the delinquent user can be removed from the services to which such user would normally have access. In another example, an Access Setting would be altered to reflect a state of a given subsystem. For one instance, it may be desirable to change machine attributes or settings, and, in such event the Access Settings would be altered temporarily from "All" or "Selected" to "SA & CSR". In another example, it might be desirable to take a system offline (by using the "None" setting) so that one or more operations can be performed relative to that service (e.g. on a related hardware subsystem) at a later time.

For yet another application, the dialog of FIG. 9 could be configured advantageously through use of the Internet of the World Wide Web. More particularly, as shown partially in FIG. 4 and disclosed further by the present description, the printing system 10 includes an HTTP server (which is accessible by way of one or more browsers. As can now be appreciated by those skilled in the art, a Web page could be established in such a manner that the dialog would be accessible to all KOs or SAs having access to a suitable browser on one of the clients 100. By providing the dialog at a Web site, the KO or SA could access the dialog even if such KO or SA were on a client possessing an operating system that differs substantially from than that of the printing machine. Moreover, assuming the dialog was associated with an appropriate URL, the dialog could be accessed by many KO/SA clients, each of which could possess an operating system that differs substantially from that of the printing machine.

Numerous features of the above-described print media sheet tray control arrangement will be appreciated by those skilled in the art.

In one embodiment, an auditron system for a multifunctional printing system having a plurality of document processing services is provided. As contemplated herein, the auditron system includes a programmable auditron subsystem which permits one of the plurality of document processing subsystems to programmed in one of a plurality of modes so that job accounting can be required on either a mandatory or voluntary basis. It is noteworthy that multiple programmable auditron subsystems can be provided so that various ones of the plurality of document processing services can each be programmed in a selected one of the plurality of modes. Accordingly, one document processing service can be programmed in one mode while another document processing service can be programmed in a second mode. Additionally, the programmable auditron subsystem can be configured so that the voluntary form of accounting is "triggered" automatically by the simple provision of an account number by a system user. Finally, services can be selectively disabled, with respect to a given user, when a preset limit set with the auditron system is exceeded by the given user.

In another embodiment, an authorization service for a multifunctional printing system having a plurality of document processing services is provided. As contemplated herein, one of a plurality of access rights levels can be set for each of the plurality of document processing services. This means that a given user can be given access rights with respect to one document processing service while being precluded from accessing another document processing service. Through use of such authorization service, a prioritization scheme can be provided across the various services. Additionally, access to the document processing services can be made password accessible so that an added level of security is provided for the various services. Finally, implementation of the authorization service is facilitated through the use of a programmable dialog, which dialog can be advantageously used in conjunction with the Internet or World Wide Web. That is, the printing system includes a networked printing machine and, through use of the Internet or World Wide Web, the dialog can be conveniently obtained, for programming thereof, at a network node disposed remotely of the printing machine.

What is claimed is:

1. In a multifunctional printing system including a printing machine for producing prints from an electronic document stored therewith, the printing machine including a plurality of document processing services with each of the plurality of document processing services causing one or more document processing operations to be performed relative to the electronic document, an auditron system for controlling a manner in which an accounting of information is performed with respect to one of the plurality of document processing services, comprising:

a user interface;

a programmable auditron subsystem communicating with said user interface and printing machine, said auditron subsystem being responsive to input at said user interface with the input causing the auditron subsystem to be disposed in one of a plurality of modes relative to the one of the plurality of document processing services; and wherein when said programmable auditron subsystem is disposed in a first one of the plurality of modes, an accounting of each document processing operation performed relative to the one of the plurality of document processing services is maintained on a mandatory basis, and when said programmable auditron subsystem is disposed in a second one of the plurality of modes, accounting of each document processing operation performed relative to the one of the plurality of document processing services is maintained selectively in accordance with user demand.

2. The auditron system of claim 1, wherein the programmable auditron subsystem is disposable in the one of the plurality of modes relative to another one of the plurality of document processing services.

3. The auditron system of claim 2, wherein the one of the plurality of document processing services causes image data corresponding with the electronic document to be created locally with respect to the printing machine and the other one of the plurality of document processing services causes electronic documents, communicated to the printing machine by way of a network connection, to be processed for output at the printing machine.

4. The auditron system of claim 2, wherein the one of the plurality of document processing services causes electronic documents, communicated to the printing machine by way of a network connection, to be processed for output at the printing machine and the other one of the plurality of document processing services causes image data corresponding with the electronic documents to be created locally with respect to the printing machine.

5. In a multifunctional printing system including a printing machine for producing prints from an electronic document stored therewith, the printing machine including a plurality of document processing services with each of the plurality of document processing services causing one or more document processing operations to be performed relative to the electronic document, an auditron system for controlling a manner in which an accounting of information is performed with respect to one of the plurality of document processing services, comprising:

a user interface;

a programmable auditron subsystem communicating with said user interface and printing machine, said auditron subsystem being responsive to input at said user interface with the input causing the auditron subsystem to be disposed in one of a plurality of modes relative to the one of the plurality of document processing services and disposable in the one of the plurality of modes relative to another one of the plurality of document processing services;

wherein said programmable auditron subsystem includes a first counting subsystem and a second counting subsystem, wherein said first counting subsystem is corresponded with the one of the plurality of document processing services and the second counting subsystem is corresponded with the other one of the plurality of document processing services; and further wherein when said programmable auditron subsystem is disposed in a first one of the plurality of modes, an accounting of each document processing operation performed relative to the one of the plurality of document processing services is maintained on a mandatory basis, and when said programmable auditron subsystem is disposed in a second one of the plurality of modes, accounting of each document processing operation performed relative to the one of the plurality of document processing services is maintained selectively in accordance with user demand.

6. The auditron system of claim 1, wherein in the second one of the plurality of modes the programmable auditron subsystem maintains accounting of each document processing operation performed relative to the one of the plurality of document processing when the user provides selected information with said user interface.

7. The auditron system of claim 1, wherein in the first one of the plurality of modes the programmable auditron system remains in a disabled state until the user provides selected information with said interface.

8. In a multifunctional printing system including a printing machine for producing prints from an electronic document stored therewith, the printing machine including a plurality of document processing services with each of the plurality of document processing services causing one or more document processing operations to be performed relative to the electronic document, an auditron system for controlling a manner in which an accounting of information is performed with respect to one of the plurality of document processing services, comprising:

a user interface;

a first programmable auditron subsystem communicating with said user interface and printing machine, said auditron subsystem being responsive to input at said user interface with the input causing the auditron subsystem to be disposed in one of a plurality of modes relative to the one of the plurality of document processing services, wherein when said first programmable auditron subsystem is disposed in a first one of the plurality of modes, an accounting of each document processing operation performed relative to the one of the plurality of document processing services is maintained on a mandatory basis, and when said first programmable auditron subsystem is disposed in a second one of the plurality of modes, accounting of each document processing operation performed relative to the one of the plurality of document processing services is maintained selectively in accordance with user demand;

a second programmable auditron communicating with said user interface, said second auditron subsystem being responsive to second input at said user interface with the second input causing the second auditron subsystem to be disposed in another one of the plurality of modes relative to another one of the plurality of document processing services; and wherein when said second programmable auditron subsystem is disposed in the first one of the plurality of modes, an accounting of each document processing operation performed relative to the other one of the plurality of document processing services is maintained on the mandatory basis, and when said second programmable auditron subsystem is disposed in the second one of the plurality of modes accounting is maintained selectively in accordance with user demand.

9. The auditron system of claim 8, wherein said programmable auditron subsystem is disposed in the first one of the plurality of modes and said second programmable auditron subsystem is disposed in the second one of the plurality of modes.

10. In a multifunctional printing system including a printing machine for producing prints from an electronic document stored therewith, the printing machine including a plurality of document processing services with each of the plurality of document processing services causing one or more document processing operations to be performed relative to the electronic document, an auditron system for controlling a manner in which an accounting of information is performed with respect to one of the plurality of document processing services, comprising:

a user interface;

a programmable auditron subsystem communicating with said user interface and printing machine, said auditron subsystem being responsive to input at said user interface with the input causing the auditron subsystem to be disposed in one of a plurality of modes relative to the one of the plurality of document processing services;

wherein when said programmable auditron subsystem is disposed in a first one of the plurality of modes, an accounting of each document processing operation performed relative to the one of the plurality of document processing services is maintained on a mandatory basis, and when said programmable auditron subsystem is disposed in a second one of the plurality of modes, accounting of each document processing operation performed relative to the one of the plurality of document processing services is maintained selectively in accordance with user demand; and further wherein said programmable auditron subsystem is disposed in the second one of the plurality of modes for performing one or more diagnostic operations relative to the printing machine.

11. The auditron system of claim 1, in which said programmable auditron subsystem is both disposed in the first one of the plurality of modes and corresponded with a counter having a limit, wherein said programmable auditron subsystem is disabled in response to the limit of the counter being reached.

12. The auditron system of claim 11, in which N print sets are programmed to be produced for the electronic document, wherein the N print sets are produced prior to disabling said programmable auditron subsystem.

13. A method for a multifunctional printing system including a printing machine for producing prints from an electronic document stored therewith, the printing machine including a plurality of document processing services with each of the plurality of document processing services causing one or more document processing operations to be performed relative to the electronic document, said method, which controls a manner in which an accounting of information is performed with an auditron subsystem relative to one of the plurality of document processing services, comprises:

causing the auditron subsystem to be disposed in one of a plurality of modes relative to the one of the plurality of document processing services in response to user input;

maintaining an accounting of each document processing operation performed relative to the one of the plurality of document processing services on a mandatory basis when the programmable auditron subsystem is disposed in a first one of the plurality of modes; and selectively maintaining an accounting of each document processing operation performed relative to the one of the plurality of document processing services in accordance with user demand when the programmable auditron subsystem is disposed in a second one of the plurality of modes.

* * * * *